Figure 1:
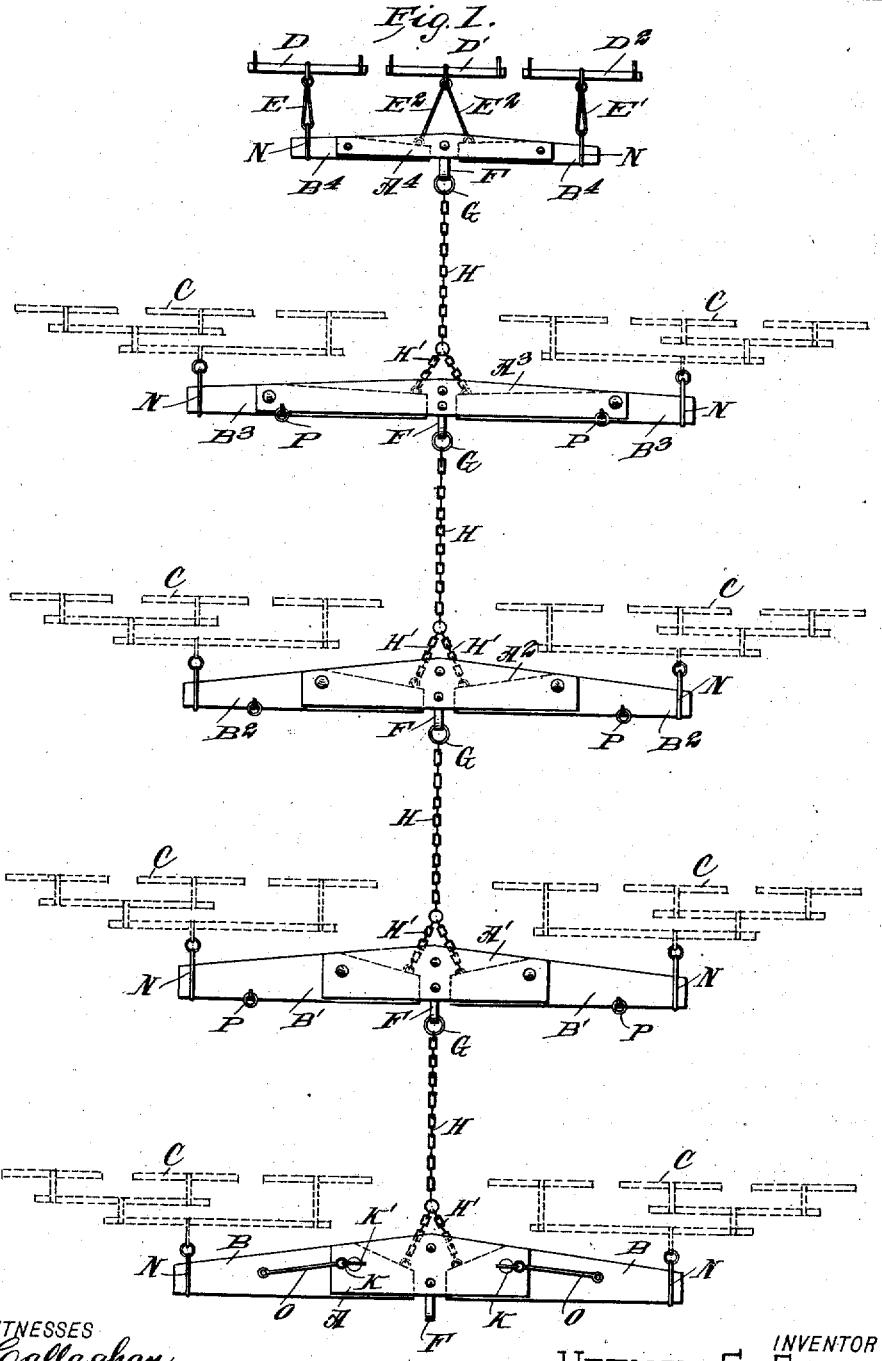

H. C. SCOTT.

DRAFT EQUALIZER.

APPLICATION FILED JUNE 18, 1908.

Reissued Apr. 27, 1909.

12,949.

2 SHEETS—SHEET 1.

WITNESSES

E. M. Callaghan

Amos N. Hart

INVENTOR

HERMON C. SCOTT

BY Munn & Co.

ATTORNEYS.

THE MORRIS PETERS CO., WASHINGTON, D. C.

H. C. SCOTT.
DRAFT EQUALIZER.
APPLICATION FILED JUNE 18, 1908.
Reissued Apr. 27, 1909.
12,949.
2 SHEETS—SHEET 2.
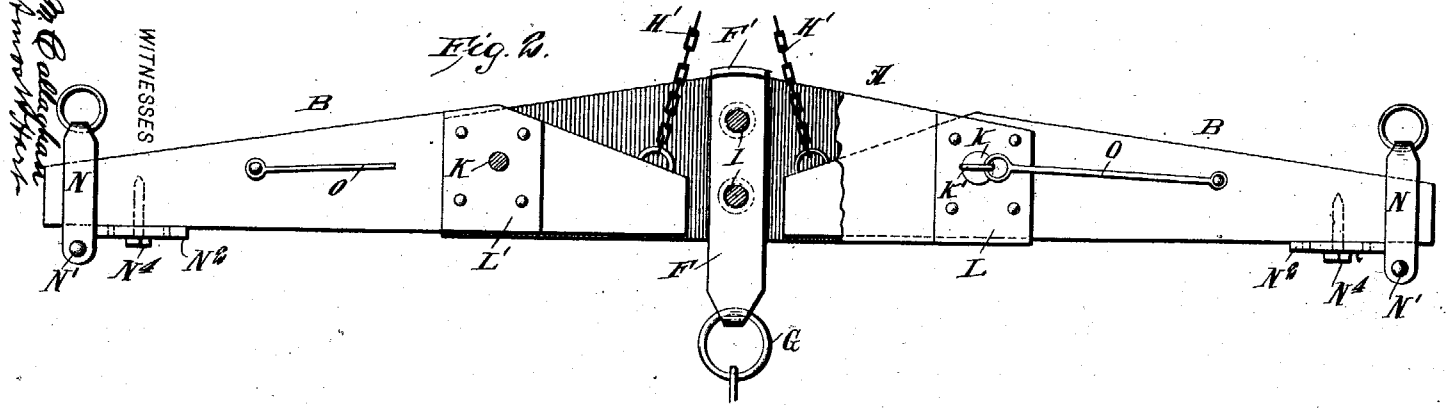
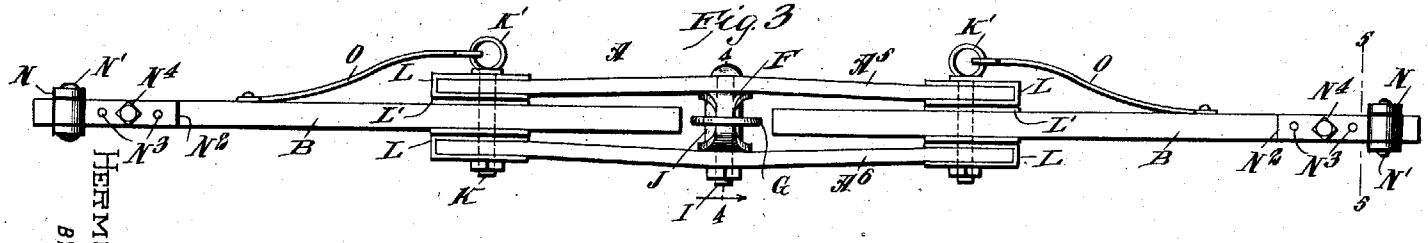
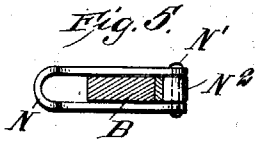
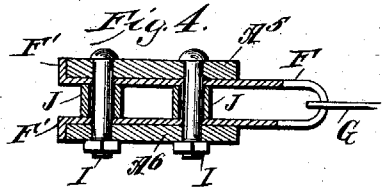
WITNESSES
E. M. Callaghan
Amos W. Hart
INVENTOR
HERMON C. SCOTT
BY Munn & Co.
ATTORNEYS.
THE NORRIS PETERS CO., WASHINGTON, D. C.

UNITED STATES PATENT OFFICE.

HERMON C. SCOTT, OF RITZVILLE, WASHINGTON, ASSIGNOR TO HARRINGTON HITCH COMPANY, OF HARRINGTON, WASHINGTON.

DRAFT-EQUALIZER.

No. 12,949. Specification of Reissued Letters Patent. Reissued April 27, 1909.

Original No. 819,463, dated May 1, 1906, Serial No. 280,556. Application for reissue filed June 18, 1908. Serial No. 439,254.

*To all whom it may concern:*

Be it known that I, HERMON C. SCOTT, a citizen of the United States, and a resident of Ritzville, in the county of Adams and State of Washington, have invented a new and Improved Draft-Equalizer, of which the following is a full, clear, and exact description.

The invention relates to draft-equalizers designed for equalizing the draft of large teams employed for hauling heavy, wheeled machines, such as harvesters, gang-plows, and the like.

The object of the invention is to provide a new and improved draft-equalizer arranged to distribute the load to be hauled equally to the animals in the team, to reduce the friction of the working parts to a minimum, and to provide a comparatively short but very strong and durable equalizer not liable to get out of order nor cause entanglement of the animals when in use.

The invention consists of novel features and parts and combinations of the same, which will be more particularly described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement as arranged for a twenty-seven-horse team. Fig. 2 is an enlarged plan view of the rearmost draft-bar and its equalizing-bars, parts being in section. Fig. 3 is an edge view of the same. Fig. 4 is a transverse section of the same on the line 4—4 of Fig. 3, and Fig. 5 is a similar view of the same on the line 5—5 of Fig. 3.

The draft-bars or doubletrees A, A′, $A^2$, $A^3$, and $A^4$ (shown in Fig. 1) are arranged one in front of the other, the rearmost draft-bar A being connected in the usual manner with the running-gear of the machine or other device to be hauled from one place to another. On the outer ends of the draft-bars are mounted to swing horizontally pairs of equalizing-bars B B, B′ B′, $B^2$ $B^2$, $B^3$ $B^3$, and $B^4$ $B^4$, and the outer ends of the equalizing-bars B B, B′ B′, $B^2$ $B^2$, and $B^3$ $B^3$ are adapted to be hitched by the usual hitching devices C to the draft-animals preferably three for each equalizing-bar, so that six animals are abreast for each draft-bar A A′ $A^2$ $A^3$. To the pair of equalizing-bars $B^4$ on the outermost draft-bar $A^4$ are hitched three draft-animals by the use of swingletrees D, D′, and $D^2$, of which the swingletrees D and $D^2$ are connected by the attaching devices E and E′ with the outermost ends of the equalizing-bars $B^4$, while the middle swingletree D′ is connected by the flexible connections $E^2$ with the inner ends of the said equalizing-bars $B^4$. Each of the draft-bars A′, $A^2$, $A^3$ and $A^4$ is provided at its middle with a fixed clevis F, and each clevis projects rearwardly and carries a ring G, connected with one end of a chain H, provided at its other end with a branch chain H′, connected with the inner ends of the next rear equalizing-bars, as will be readily understood by reference to Fig. 1.

The fulcrum-points of the several pairs of equalizing-bars B B, B′ B′, $B^2$ $B^2$, $B^3$ $B^3$, and $B^4$ $B^4$ vary according as the power in front diminishes relative to the drafts on the outer ends of the equalizing-bars, so that finally the three leading animals connected with the swingletrees D, D′, and $D^2$ pull against the animals immediately behind.

The detail construction of each draft-bar A, A′, $A^2$, $A^3$ and $A^4$ is as follows: Each draft-bar is formed of two members $A^5$ and $A^6$, connected with each other at the middle by bolts I, which extend through the said members and through the side arms of the corresponding U-shaped clevis F, (see Fig. 4,) a thimble J being placed on each bolt I between the opposite faces of the side arms of the clevis F, so as to space the members $A^5$ and $A^6$ a desired distance apart and to allow of bending the members $A^5$ and $A^6$ into a curved or arched shape, as plainly indicated in Fig. 3 by the use of the bolts K, extending through the outer ends of the members $A^5$ and $A^6$ and forming the fulcrums for the corresponding equalizing-bars B B, B′ B′, $B^2$ $B^2$, $B^3$ $B^3$ and $B^4$ $B^4$. Each of the clevises F is provided at the terminals of its side arms with angular flanges F′, abutting against the front edges of the members $A^5$ and $A^6$ of the draft-bar to relieve the bolts I as much as possible of the strain exerted on the clevis F. Each of the bolts K extends through rubbing-plates L on the members $A^5$ and $A^6$ of the draft-bar, and also through rubbing-plates L′ on the equalizing-bars to reduce the friction of each equalizing-bar to a minimum, it being understood that by adjusting the nuts on the bolts K the desired contact can be obtained between the rubbing-plates L′ and L. By curving the members $A^5$ and $A^6$, as described and shown in Fig. 3, sufficient clearance is given for the inner ends of the equalizing-bars to allow free swinging movement thereof without danger of producing undue friction. On the outer end of each equalizing-bar is arranged a clevis N for connection with the corresponding hitching device C or the swingletrees D and $D^2$, previously described, and each clevis N is made U-shape (see Fig. 5) and straddles the corresponding equalizing-bar, and its rear end is pivotally connected at N′ with a strap $N^2$, fitting against the rear edge of the equalizing-bar and provided with a number of apertures $N^3$, one of which is engaged by a bolt $N^4$, employed for securing the strap $N^2$ to the equalizing-bar. By having the several apertures $N^3$ the strap $N^2$ can be readily adjusted in a longitudinal direction on the equalizing-bar to bring the clevis N into proper position. Thus a hitching device may be readily adjusted in a transverse direction by adjusting the strap $N^2$ of the clevis N correspondingly, and without requiring detachment of the team connected at the time with the corresponding hitching device. As the outer portions of the rearmost equalizing-bars B are of considerable length, I prefer to connect the outer portions of the said equalizing-bars by braces O with eyes K′, formed on the upper ends of the pivot-bolts K, held on the rearmost draft-bar A. As each brace O is free to turn in the eye K′, it is evident that it does not interfere with the free swinging movement of the corresponding equalizing-bar B, and at the same time the latter is properly braced. The several equalizing-bars B′, $B^2$, and $B^3$ are provided with tie-rings P for attaching the heads of horses which are immediately in the rear of such bars. By arranging the equalizing-bars between the members $A^5$ and $A^6$ of a draft-bar and by connecting the equalizing-bars with the next clevis F ahead in the manner described it is evident that a comparatively short draft-equalizer is provided, even when a very large number of draft-animals is employed. It will further be seen that by the arrangement described an entanglement of the draft-animals is not liable to take place, and an exceedingly strong and durable draft-equalizer is provided not liable to get out of order or be broken when in use.

What I claim is:

1. A draft-equalizer comprising a plurality of successively-arranged draft-bars, a pair of equalizing-bars pivoted on each draft-bar, flexible connections between the inner ends of a pair of equalizing-bars and the middle of the next draft-bar ahead, and braces connecting the rearmost draft-bar with its equalizing-bars.

2. A draft-equalizer comprising a plurality of successively-arranged draft-bars, each made of a pair of spaced members, a clevis and means securing the clevis and members together at the middle thereof, pivots secured to the outer ends of the said members, a pair of equalizing-bars mounted to swing on the said pivots between the said spaced members, and chains connecting the inner ends of a pair of equalizing members with the clevis on the next draft-bar ahead.

3. A draft-equalizer provided with a draft-bar formed of spaced members, a clevis having its side arms engaging the inner opposite faces of the said members at the middle thereof, and bolts passing through the said members and the side arms of the said clevis.

4. A draft-equalizer provided with a draft-bar formed of spaced members, a clevis having its side arms engaging the inner opposite faces of the said members at the middle thereof, bolts passing through the said members and the side arms of the said clevis, pivots held in the outer ends of the said spaced members, and equalizing-bars extending between the said members and fulcrumed on the said pivots.

5. A draft-equalizer provided with a draft-bar formed of spaced members, a clevis having its side arms engaging the inner opposite faces of the said members at the middle thereof, the terminals of the said clevis side arms having angular flanges engaging the front edges of the said members, and bolts passing through the said members and the side arms of the said clevis.

6. A draft-equalizer provided with a draft-bar formed of spaced members, a clevis having its side arms engaging the inner opposite faces of the said members at the middle thereof, bolts passing through the said members and the side arms of the said clevis, and thimbles on the said bolts between the said side arms of the clevis, to spread the said members farther apart at the middle than at the ends.

7. A draft-equalizer provided with an equalizing bar and a clevis for the outer end of the said equalizing-bar, the clevis being fulcrumed on an attaching-strap having a plurality of apertures, and a bolt on the said outer end of the equalizing-bar engaging one of the said apertures.

HERMON C. SCOTT.

Witnesses:
D. R. Throop,
Chas. T. Stanley.